(12) United States Patent
Davies et al.

(10) Patent No.: US 9,077,673 B2
(45) Date of Patent: *Jul. 7, 2015

(54) CONTENT-BASED NOTIFICATION AND USER-TRANSPARENT PULL OPERATION FOR SIMULATED PUSH TRANSMISSION OF WIRELESS EMAIL

(71) Applicant: Rockliffe Systems, Campbell, CA (US)

(72) Inventors: John Davies, Sunnyvale, CA (US); Martin Chapman, Egerton (GB)

(73) Assignee: Rockliffe Systems, Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/246,201

(22) Filed: Apr. 7, 2014

(65) Prior Publication Data

US 2015/0081812 A1 Mar. 19, 2015

Related U.S. Application Data

(63) Continuation of application No. 13/757,775, filed on Feb. 2, 2013, now abandoned, which is a continuation of application No. 12/418,571, filed on Apr. 4, 2009, now Pat. No. 8,428,604, which is a continuation of application No. 11/268,903, filed on Nov. 7, 2005, now Pat. No. 7,532,890.

(60) Provisional application No. 60/667,038, filed on Apr. 1, 2005.

(51) Int. Cl.
*H04W 4/00* (2009.01)
*H04L 12/58* (2006.01)
*H04L 29/08* (2006.01)

(52) U.S. Cl.
CPC .............. *H04L 51/046* (2013.01); *H04L 67/26* (2013.01); *H04L 51/08* (2013.01)

(58) Field of Classification Search
CPC ..... H04L 69/16; H04L 12/5895; H04L 69/08; H04L 12/587; H04L 51/24; H04W 4/12; H04W 4/18

USPC ......... 455/466, 412.1, 412.2, 414.4; 709/206, 709/207, 232, 236; 370/395.5, 466, 467

See application file for complete search history.

(56) References Cited

U.S. PATENT DOCUMENTS 6,781,972 B1 * 8/2004 Anderlind et al. ............ 370/329
7,092,497 B1 * 8/2006 Spielman et al. .......... 379/88.12

(Continued)

FOREIGN PATENT DOCUMENTS

GB         2380897 A  *  4/2003  ............... H04Q 7/22
WO    WO 0078067 A1  * 12/2000  ............... H04Q 7/22

*Primary Examiner* — Allahyar Kasraian
(74) *Attorney, Agent, or Firm* — Nancy R. Gamburd; Gamburd Law Group LLC (57) ABSTRACT

Exemplary system, method, software and apparatus embodiments provide for creating a content-based notification for a mobile device, as a simulated push operation, for devices which do not have push capability. The system comprises a database, a server, and may also include a second web server for user account configuration. The database is adapted to store user account configuration and preference information. The server is adapted to receive a first message having a first protocol, such as SMTP, and to determine whether the content-based notification for the first message should be provided. When the content-based notification is to be provided, the server is adapted to extract a subset of information from the first message, and using the subset of information, to create a second message having a second, different protocol, such as SMS. The second message is transferred to a wireless network for transmission to the mobile device, with the second message providing the content-based notification of the first message. The information extracted from the first message enables a user to determine whether they want to download the complete message, as a user-transparent pull operation, and typically includes the from, to, size, date, subject fields, and a portion of the body of the first message, up to the remaining capacity of the second message.

26 Claims, 5 Drawing Sheets

(56) References Cited

U.S. PATENT DOCUMENTS

| | | | |
|---|---|---|---|
| 7,155,243 B2* | 12/2006 | Baldwin et al. | 455/466 |
| 7,221,951 B2* | 5/2007 | Anvekar et al. | 455/466 |
| 2003/0016639 A1* | 1/2003 | Kransmo et al. | 370/335 |
| 2003/0036380 A1* | 2/2003 | Skidmore | 455/414 |
| 2003/0172167 A1* | 9/2003 | Judge et al. | 709/229 |
| 2005/0047562 A1* | 3/2005 | Holz et al. | 379/88.22 |

* cited by examiner

CONTENT-BASED NOTIFICATION AND USER-TRANSPARENT PULL OPERATION FOR SIMULATED PUSH TRANSMISSION OF WIRELESS EMAIL

CROSS-REFERENCE TO RELATED APPLICATIONS

This application is a continuation of and claims priority to and the benefit of U.S. patent application Ser. No. 13/757,775, filed Feb. 2, 2013, inventors John Davies et al., entitled "Content-Based Notification and User-Transparent Pull Operation for Simulated Push Transmission of Wireless Email", which is a continuation of and claims priority to and the benefit of U.S. patent application Ser. No. 12/418,571, filed Apr. 4, 2009, inventors John Davies et al., entitled "Content-Based Notification and User-Transparent Pull Operation for Simulated Push Transmission of Wireless Email", which is a continuation of and claims priority to and the benefit of U.S. patent application Ser. No. 11/268,903, filed Nov. 7, 2005, inventors John Davies et al., entitled "Content-Based Notification and User-Transparent Pull Operation for Simulated Push Transmission of Wireless Email", which is a nonprovisional and a conversion of and further claims priority to and the benefit of U.S. Provisional Patent Application Ser. No. 60/667,038, filed Apr. 1, 2005, inventors John Davies et al., entitled "System to Simulate Push Based Email Delivery", all of which are commonly assigned herewith, the contents of which are incorporated herein by reference with the same full force and effect as if set forth in their entireties herein, and with priority claimed for all commonly disclosed subject matter.

FIELD OF THE INVENTION

The present invention, in general, relates to wireless transmission of electronic mail ("email") to mobile devices and, more particularly, relates to an apparatus, method, system and software for providing wireless, content-based notification of an email to a mobile device using a first, limited capacity protocol, and a user-transparent pull operation for a simulated push transmission of a complete email using a second protocol.

BACKGROUND OF THE INVENTION

Electronic mail to many mobile devices such as cellular telephones, "smart" cellular telephones, personal digital assistants ("PDAs"), and notebook computers, in the prior art, have typically required a user to first initiate a communication session with the service provider. Following establishment of the session, the user may then query or otherwise determine whether any email is available for wireless downloading to the mobile device and, if so, request the download (i.e., thereby performing a "pull" operation).

These various mobile devices, such as a typical cellular phone, are limited to such pull operations for downloading email or other information, and do not have other or additional capabilities. Such limitations are due to hardware, software, or both hardware and software. In addition, the infrastructure provided by the service provider is also limited, due to either the various protocols utilized (e.g., Advanced Mobile Phone System ("AMPS"), Code Division Multiple Access ("CDMA"), Global System for Mobile ("GSM")) or to limited bandwidth for a given service area. To determine whether email is available throughout a day, a user must repeatedly initiate such wireless communication sessions, regardless of whether email is, in fact, available for downloading. Not only is such an activity a waste of the user's time and effort when no email is available, such repeated query sessions also drain and waste precious battery capacity, and utilize limited and potentially expensive airtime. In addition, when email is available, the user's receipt of the email typically has been delayed until the user, in fact, initiates the communication session and performs the query. From the perspective of the service provider, such repeated query sessions may also be a waste of available bandwidth and service capacity.

As an alternative, service providers may provide a dedicated infrastructure to automatically send all email to specialized mobile devices, such as the Blackberry devices provided by Research In Motion, which have the capability and are configured to automatically receive all email without such a prior query session (i.e., the devices and service provider have always on "push" technology). Such devices, however, are significantly more complicated and expensive than typical mobile telephones and, in addition, require support from a specialized infrastructure. This push technology is not compatible with many, if not most, current and legacy cellular telephones.

As a consequence, a need remains for a method, apparatus and system to provide a simulated push operation of email to these devices which are capable of only pull operations, using a wireless transmission infrastructure which does not have such separate push capability or which is otherwise limited by bandwidth or service capacity.

SUMMARY OF THE INVENTION

The exemplary embodiments of the present invention provide a method, apparatus, software and system which create a content-based notification of an email which is transmitted to a typical, generic or legacy mobile device, such as a cellular telephone or PDA. The various exemplary embodiments thereby provide a simulated push operation of email to these devices which are capable of only pull operations, and use a wireless transmission infrastructure which does not have such separate push capability or is otherwise limited by bandwidth or service capacity. The method, apparatus, software and system of the exemplary embodiments utilize currently available protocols having limited capacity channels to provide a notification of an email to the mobile device, with the notification having sufficient and meaningful information to enable a user to reasonably determine whether to view a corresponding complete email using a transparent pull operation. The exemplary method, apparatus and system embodiments also provide for user customization, such that a user is notified of only those emails which the user has determined would be significant in a given period of time or in a given location.

A first exemplary embodiment provides a system for creating a content-based notification for a mobile device using a plurality of communication protocols. The system comprises a database, a server, and may also include a second, web server. The database is adapted to store user account configuration and preference information. The server is adapted to receive a first message having a first protocol of the plurality of communication protocols and to determine whether the content-based notification for the first message should be provided. When the content-based notification is to be provided, the server is adapted to extract a subset of information from the first message; using the subset of information, to create a second message having a second protocol of the plurality of communication protocols, in which the second protocol is different than the first protocol; and to transfer the second message for transmission to the mobile device, with the second message providing the content-based notification of the first message.

Typically, the first protocol is Simple Mail Transport Protocol (SMTP) or an extension of Simple Mail Transport Protocol, and the second protocol is Short Message Service (SMS), which has an information capacity substantially less than the information capacity of an SMTP message, by as much as several orders of magnitude. The web server is adapted to provide user access for user account configuration and user preference determination, and to store user account configuration and preference information in the database Depending upon the selected embodiment, the server is further adapted to encapsulate the second message as a data payload in a third message having a third protocol, which may be SMTP or another protocol, such as Hypertext Transfer Protocol ("HTTP"), Extensible Markup Language ("XML"), SIP (Session Initiation Protocol) for Instant Messaging and Presence Leverage Extensions ("SIMPLE"), Internet Relay Chat ("IRC"), Extensible Messaging and Presence Protocol ("XMPP"), or Instant Messaging ("IM", also referred to as Instant Message or Instant Messenger); to provide an address header for the third message for the mobile device; and to transmit the third message to a wireless network for extraction of the second message from the third message and transmission of the second message to the mobile device.

In exemplary embodiments, the server is further adapted to authenticate an account of the recipient of the first message. The server may be further adapted to filter the first message using at least one security filter of a plurality of security filters, the plurality of security filters comprising at least two filters of the following filters: Directory Harvest Attack Protection; Secure Sockets Layer; Transport Layer Security; Real-time Blacklist Lookup ("RBL"); an allowable message list; a prohibited message list; a firewall, and a user-defined security processes. The server may be further adapted to filter the first message using at least one filter of a plurality of filters, the plurality of filters comprising at least two filters of the following filters: an anti-virus filter, an anti-spam filter; a sieve rule filter; an insertion filter; and a user-defined filter. In selected embodiments, the server is further adapted to apply a plurality of sieve rule processes to the first message. In addition, the server may be further adapted to modify, reject, delete, redirect, archive, log or quarantine the first message. The system may also be adapted to determine whether the content-based notification for the first message should be provided by determining at least one user preference of a plurality of user preferences, the plurality of user preferences comprising at least two of the following user preferences: day of the week, time of day, one or more keywords, sender, location, spam score, type of attachment, or forwarded account.

Extracting the subset of information from the first message may be performed by the server, in exemplary embodiments, by selecting a plurality of fields of the first message, the plurality of fields comprising at least two of the following fields: a "FROM" field; a "TO" field; a "DATE" field; a "SIZE" field; a "SUBJECT" field; a "CC" field; all or a variable portion of a "BODY" field up to a remaining capacity of the second message; an attachment type; an attachment name; a number of attachments; an attachment size; an inserted tag; an inserted message; an inserted banner; an inserted spam score; an email group designation; or a user-defined field. The server may be further adapted to create the second message by differentially selecting the plurality of fields based on whether the first message was transmitted as a message forward or as a direct message.

In exemplary embodiments, the server is further adapted to, in response to a user request, transfer the first message for transmission of all or part of the first message to the mobile device. The user request is typically transmitted using another protocol, such as a version of either Post Office Protocol (POP or POP3) or Internet Message Access Protocol (IMAP).

Another exemplary embodiment provides an apparatus for creating a content-based notification for a mobile device using a plurality of communication protocols. The apparatus comprises a network interface, a memory, and a processor. The network interface is couplable to a communication channel to receive a first message having a Simple Mail Transport Protocol (SMTP) of the plurality of communication protocols and to transmit a third (SMTP) message to a wireless network for extraction of a second message from the third message and transmission of the second message to the mobile device. The memory is adapted to store user account configuration and preference information. The processor is adapted to authenticate an account of the recipient of the first message; to determine whether the content-based notification for the first message should be provided; when the content-based notification is to be provided, to extract a subset of information by selecting a plurality of fields from the first message and, using the subset of information, to create the second message having a Short Message Service (SMS) protocol of the plurality of communication protocols, and the second message providing the content-based notification of the first message; to encapsulate the second message as a data payload in the third message and to provide an address header for the third message for the mobile device.

An exemplary method embodiment of creating a content-based notification for a mobile device using a plurality of communication protocols is also provided. The exemplary method comprises: receiving a first message having a first protocol of the plurality of communication protocols; determining whether the content-based notification for the first message should be provided; when the content-based notification is to be provided, extracting a subset of information from the first message; using the subset of information, creating a second message having a second protocol of the plurality of communication protocols, the second protocol being different than the first protocol; and transferring the second message for transmission to the mobile device, the second message providing the content-based notification of the first message. The method may also include encapsulating the second message as a data payload in a third message having a third protocol; providing an address header for the third message for the mobile device; and transmitting the third message to a wireless network for extraction of the second message from the third message and transmission of the second message to the mobile device.

In the exemplary embodiments, the method also provides for transferring the first message for transmission of all or part of the first message to the mobile device, in response to a user request, such as a POP3 or IMAP request. In addition, user access is also provided through a web server for user account configuration and user preference determination, followed by storing user account configuration and preference information in a database.

An exemplary software embodiment, as a tangible medium storing machine-readable instructions (e.g., storing computer readable software), is also provided for creating a content-based notification for a mobile device using a plurality of communication protocols. The exemplary tangible medium storing computer readable software comprises a plurality of program constructs which perform the methodology of the invention, and may comprise one of more of the following program constructs: a first program construct adapted to provide for storing user account configuration and preference information; a second program construct adapted to determine whether the content-based notification should be provided for a received first message having a Simple Mail Transport Protocol (SMTP) of the plurality of communication protocols; a third program construct adapted, when the content-based notification is to be provided, to extract a subset of information by differentially selecting a plurality of fields from the first message; a fourth program construct adapted to use the subset of information to create a second message having a Short Message Service (SMS) protocol of the plurality of communication protocols; a fifth program construct adapted to encapsulate the second message as a data payload in a third SMTP message and to provide an address header for the third SMTP message for the mobile device; a sixth program construct adapted to receive a user request transmitted using a fourth protocol, wherein the fourth protocol is a version of either Post Office Protocol (POP or POP3) or Internet Message Access Protocol (IMAP); and a seventh program construct adapted, in response to the user request, to transfer the first message for transmission of all or part of the first message to the mobile device. Additional program constructs, and variations of such program constructs, will be apparent to those of skill in the art, for performance of the various methodologies of the present invention.

These and additional embodiments are discussed in greater detail below. Numerous other advantages and features of the present invention will become readily apparent from the following detailed description of the invention and the embodiments thereof, from the claims and from the accompanying drawings.

BRIEF DESCRIPTION OF THE DRAWINGS

The objects, features and advantages of the present invention will be more readily appreciated upon reference to the following disclosure when considered in conjunction with the accompanying drawings and examples which form a portion of the specification, in which.

DETAILED DESCRIPTION OF EXEMPLARY EMBODIMENTS

While the present invention is susceptible of embodiment in many different forms, there are shown in the drawings and will be described herein in detail specific examples and embodiments thereof, with the understanding that the present disclosure is to be considered as an exemplification of the principles of the invention and is not intended to limit the invention to the specific examples and embodiments illustrated, and that numerous variations or modifications from the described embodiments may be possible and are considered equivalent.

Figure 1:
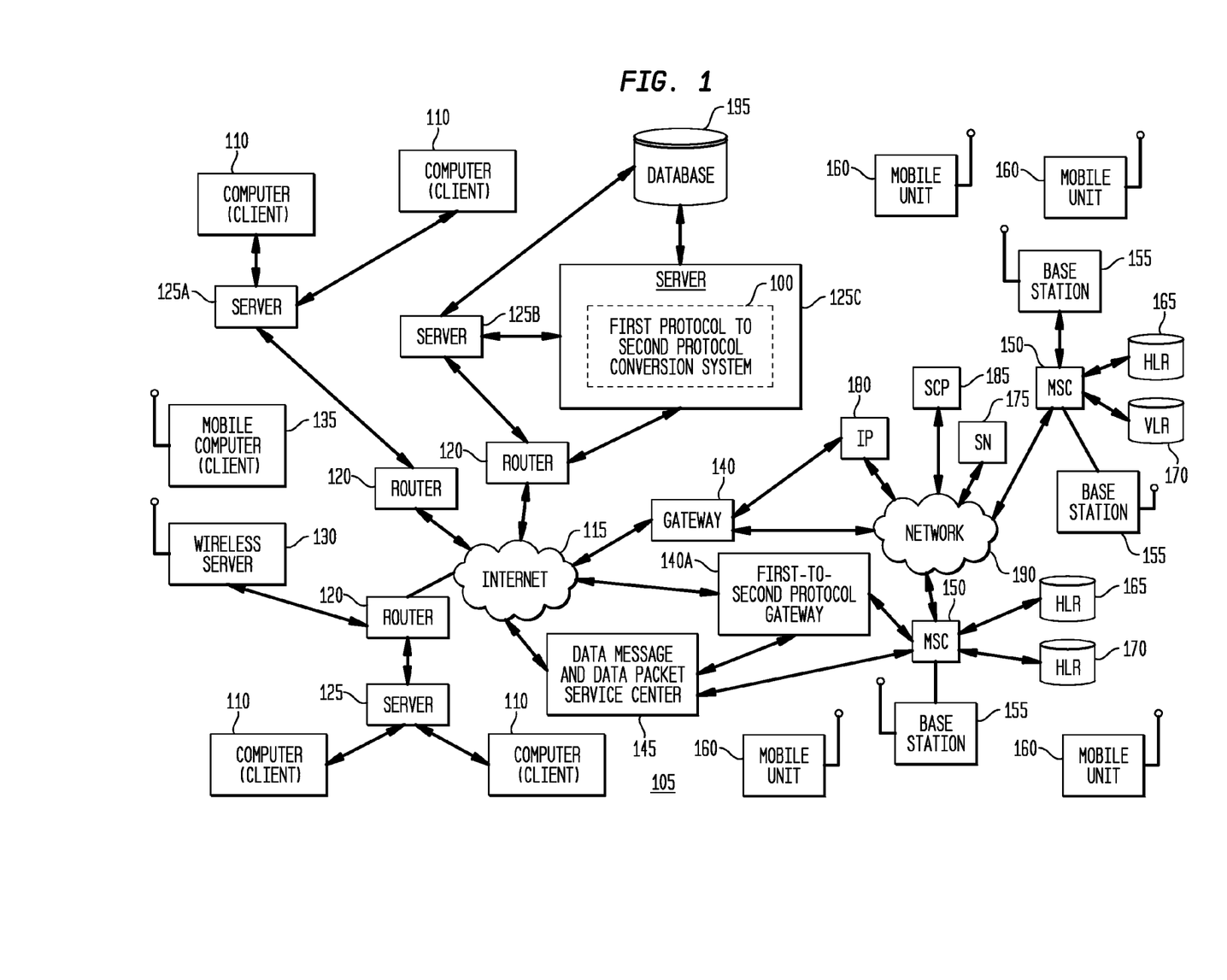
FIG. 1 is a block diagram illustrating an exemplary system embodiment in accordance with the teachings of the present invention.
Figure 2:
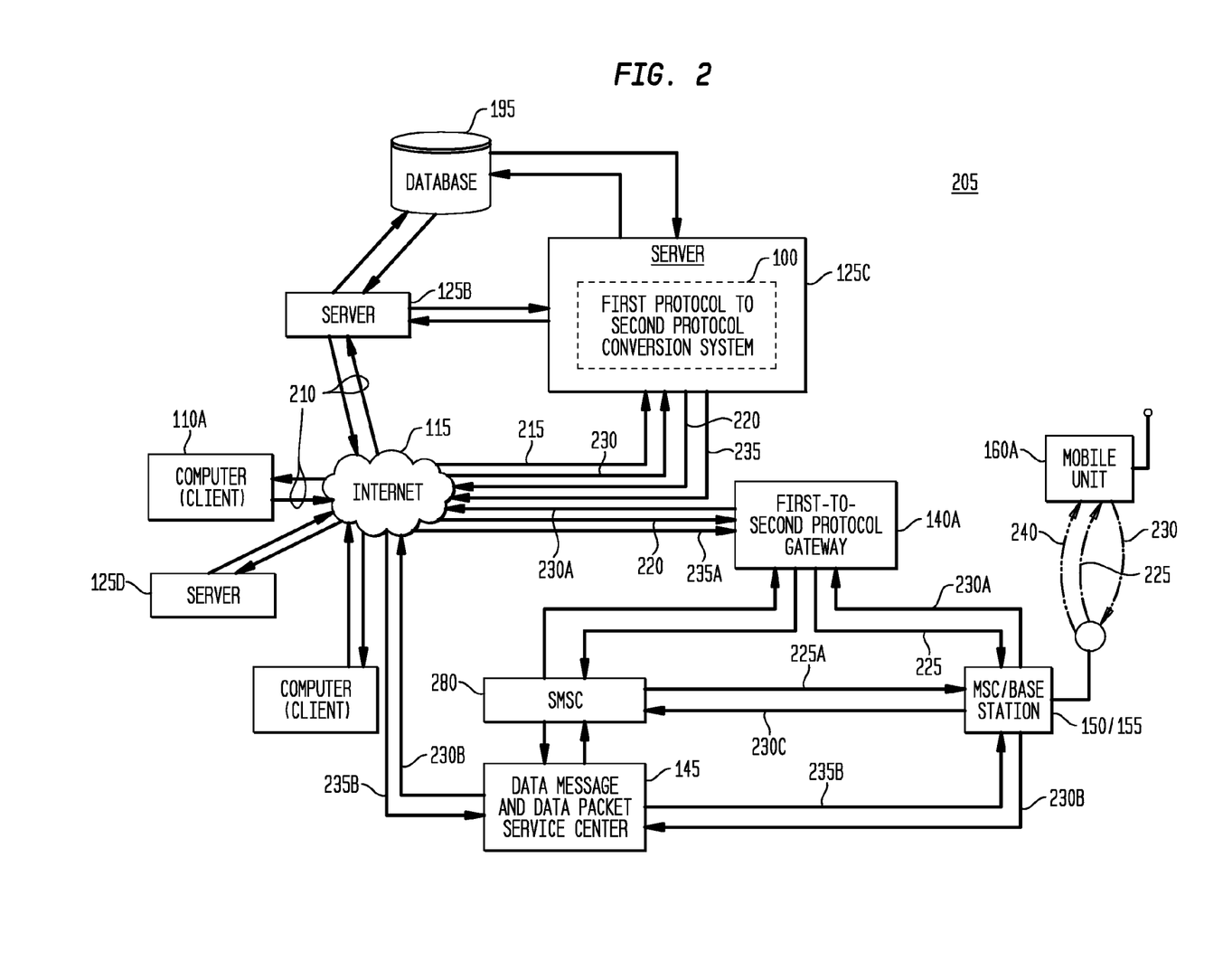
FIG. 2 is a block and flow diagram illustrating, in greater detail, an exemplary system embodiment and exemplary messaging flows in accordance with the teachings of the present invention.

FIG. 1 is a block diagram illustrating an exemplary system 105 embodiment in accordance with the teachings of the present invention. FIG. 2 is a block and flow diagram illustrating, in greater detail, an exemplary system 205 embodiment and exemplary messaging flows in accordance with the teachings of the present invention. As illustrated in FIGS. 1 and 2, the systems 105 and 205 each comprise a first protocol to second protocol conversion system ("protocol conversion system") 100, and may also include a mobile switching center ("MSC") 150, a data message and data packet service center 145, and various gateways 140. The first protocol to second protocol conversion system 100 may be embodied as a stand-alone server or as a plurality of servers, such as one or more of servers 125 (or 125A, 125B, 125D) and the separately illustrated server 125C, discussed below, or as any other type of processing device, now known or which becomes known in the art. As illustrated, the first protocol to second protocol conversion system 100 is incorporated within a server 125C adapted to perform the methodology of the present invention. Equivalently, the first protocol to second protocol conversion system 100 may be embodied within any other type of server, workstation or computer, such as a web server 125B or an email server 125A, or within telecommunication or mobile network equipment such as MSCs 150, gateways 140, data message and data packet service center 145, and so on, and all such variations are within the scope of the present invention.

The gateways 140 are illustrated generally as gateway 140 and, more particularly, as a first-to-second protocol gateway 140A. Also illustrated in FIGS. 1 and 2 are a plurality of computers or other client devices 110, coupled through one or more servers 125 (such as email and web servers) and routers 120 to the Internet 115 or other packet-based network (such as an Ethernet, a local area network ("LAN"), a wide area network ("WAN"), or other network such as a metropolitan area network, not separately illustrated). (For ease of reference, while such routers 120 are not separately illustrated in FIG. 2, their presence and operation is implicit and will be understood as such by those of skill in the art.) For example, one of the various servers 125, illustrated as server 125A, may be a corporate email server (such as provided by a business) or may be an Internet email server (such as from an Internet Service Provider ("ISP")). In addition, the various servers 125 include web servers (illustrated as server 125B), for provision of web pages, as known in the art. Similarly, mobile devices such as mobile computers or other mobile client devices 135 may also be coupled to the various networks such as Internet 115 through one or more wireless servers 130, which may include either or both email and web services (which may comprise a server 125 with additional wireless capability, such as Bluetooth or IEEE 802.11 capability, for example).

System users may generate and receive emails on these various client devices 110 and 135 (e.g., computers or other network communication client devices), and further, may customize or otherwise configure and provide user preferences for the various systems of the present invention, as discussed in greater detail below. For example, a user may configure user preferences through a web-based interface provided through web server 125B, with the user configuration information and preferences stored in a database 195, which is also accessible by the protocol conversion system 100.

Other illustrated networks 190, such as a public switched telephone network ("PSTN"), are typically utilized for circuit-switched voice and data transmission, and are coupled to MSCs 150 for wireless communication (via wireless base stations 155) with mobile units 160, such as cellular telephones and PDAs, as known in the art.

For such mobile communications, the service provider generally tracks the location of a mobile unit 160, at any given time, through a home location register ("HLR") 165 and visitor location register ("VLR") 170, also as known in the art. In addition, other intelligent network devices may also be included, such as an intelligent peripheral ("IP") 180, a service control point ("SCP") 185, a service node ("SN") 175, also as known in the art. Depending upon the selected embodiment, the various systems of the present invention may be incorporated into such intelligent network devices, in addition to separate devices such as the first protocol to second protocol conversion system 100, servers 125, or other telecommunication equipment discussed above.

As discussed in greater detail below, a user will configure the email notification system of the present invention, for their personal preferences, for example, typically through an Internet 115 connection from a user's computer (client 110) to a web server 125B, such as through an Internet browser, or will provide such configuration through a representative of a service provider (such as through a voice communication), and so on. This configuration of the user's account and preferences is stored in database 195, and may occur upon establishment of an account, or may be adapted or changed at any time, particularly as the user has utilized the systems 105 or 205 and has determined their needs and preferences based upon actual usage experience. Such web-based configuration of the user's account and preferences is illustrated as full duplex communications 210 in FIG. 2.

In addition, such configuration of user preferences can be "self-changing" according to user-specified criteria. For example, with respect to time and date, a user may specify a first set of preferences for the work week, Monday through Friday, 9 a.m. to 5 p.m., such that a first type of email notifications are provided, while a second type of email notifications are provided in the evenings and balance of the day. Similarly, with respect to location, different types or sets of email notifications may be transmitted (or not transmitted), for example, based upon global positioning system ("GPS") information, home region or roaming locations (e.g., to receive only work-related email while roaming in particular locations). Also for example, user preferences may include different types of treatments based upon keywords or sources of email, such as sending news updates from Google which have the keyword "Giants" in the title or body.

The user will also configure their email account(s) to be forwarded to a designated email server 125C, utilized to provide the various emails and email notifications in accordance with the present invention, such as a MailSite® server. (Such forwarding may be unnecessary when the user's wireless communication service provider is also their email or Internet service provider.) For example, the user may configure their corporate and/or personal email accounts to forward all or some of their email to server 125C, such as emails only from certain senders and/or emails which are not from other senders, or for different days and time periods. In addition, regardless of any forwarding capability, email for the user may be sent directly to the server 125C, as a primary account, such as email directed to user@mailsite.com. Similarly, if the user cannot configure their email account to be partially or variably forwarded, such as to forward emails from particular senders and/or not from other senders, such configuration is available directly through the email notification system of the present invention, such as the various configurations discussed above.

For example, a user may configure his or her system 105, 205 preferences based upon time, date, and sender, such as to forward certain types of emails during the business week and during business hours, and to forward personal email during evenings and weekends. A user may configure his or her system 105, 205 preferences based upon keywords or other content, types of attachments, sender locations (through a reverse database lookup), and so on. Also for example, the user may choose that emails with certain types of attachments, such as photographs, video or graphics, or from certain locations (e.g., San Francisco), are not to be forwarded, while other emails having certain keywords or FROM fields (e.g., "Phone Bill") are to be forwarded. The user may configure their system preferences based on the forwarded account, such as for sending email notifications for forwarded corporate emails in a certain time period of the day and for sending email notifications for forwarded personal account emails in another, second time period of the day. As another example, a user may customize their account by only forwarding emails sent specifically to them, and not to other people, such as to avoid "CC" emails to their direct reporting employees. As yet additional examples, a user may configure his or her system preferences to only forward emails having an unsolicited email ("spam") score below a predetermined threshold. Such customization may be accomplished through user selections available with the various sieve rules and filters provided in the exemplary embodiments, discussed below.

It should be noted that the ability of the user to add, subtract, and otherwise modify such rules or filters for email notification transmission (as well as provide specific triggering criteria) is a unique capability of the exemplary embodiments of the present invention. In addition, as illustrated, the user may configure their rules to modify other rules or spawn new rules.

Email applications typically utilize a first protocol, referred to as the Simple Mail Transport Protocol ("SMTP") with its various extensions and modifications, such as Extended SMTP (ESMTP) (collectively "SMTP"). In accordance with the present invention, a first email message transmitted using a first protocol (e.g., SMTP) will be forwarded or directly transmitted to server 125C (illustrated as communication 215), such as from server 125B or 125D or directly from computer/client 110B. The first protocol to second protocol conversion system 100 (within server 125C), in accordance with the present invention, will modify and convert the first message having the first protocol into a second message having a second protocol, such as the Short Message Service ("SMS") protocol provided in mobile communications. In addition to SMS, depending upon the selected embodiment and service provider, other second protocols may also be utilized, such as IM, or Caller Identification ("Caller ID", such as by spoofing the Caller ID to transport the second message), or other legacy or limited capacity channels usually reserved for system signaling rather than data or voice transport. Depending upon user configurations and preferences, a first, SMTP email message will be processed and further modified by selecting and extracting certain fields from the first message, which will then be transformed into a second message, such as an SMS message. In selected embodiments, this SMS message may be transmitted directly to the user's mobile unit 160. If this second (SMS) message is not to be transmitted directly to the user, such as when the protocol conversion system 100 is not directly coupled to or co-located with an MSC 150, data message and data packet service center 145, or base station 155, the second message will be encapsulated (or tunneled) as a data payload in a third message using another, third protocol, which may be the same protocol as the first protocol (SMTP) or may be a different protocol, such as HTTP, XML, SIMPLE, IRC, XMPP or IM. In various exemplary embodiments, the second (SMS) message is encapsulated in a third (SMTP) message, such that the third protocol is the same as the first protocol, and transmitted (communication 220) to a first-to-second protocol gateway 140A, such as an SMTP-to-SMS gateway. In accordance with the present invention, such a first-to-second protocol gateway 140A is configured to extract the second SMS message from the payload of the third SMTP message, for subsequent wireless transmission to the user's mobile unit 160A (illustrated as communication legs 225, 225A). Additional transmission means for the second and/or third messages are discussed below.

In the exemplary embodiments, the second message generally contains a subset of (and significantly less than) the data of the original, first email message. For example, when utilizing SMS, the second message will have a defined, limited capacity, such as up to 190 bytes (or characters), depending upon the encoding and access method. A typical email may include considerably more bytes/characters in just the email envelope or email header information, without considering the substantive bytes of the message body. In addition, such envelope information and much of the header information is typically meaningless to an email subscriber. If such information is simply transmitted to the user, without more, the user will generally have no reasonable basis to determine whether the entire email should be examined (through the user-transparent pull operation, discussed below). As a consequence, in accordance with the present invention, predetermined and generally meaningful information is extracted from the original (first) email message, by the protocol conversion system 100, to enable the user to make such determinations when the second (SMS) message is received by the mobile unit 160.

More particularly, certain user-defined or default fields are extracted from the original (first) email message by the first protocol to second protocol conversion system 100, such as the "FROM" field, the "TO" field, the "DATE" field, the "SIZE" field, the "SUBJECT" field, and if remaining second message capacity is available, any and all bytes or characters from the "BODY" field up to the remaining capacity of the second SMS message. Other fields for inclusion within the second (SMS) message are also available, depending upon the selected embodiment and user preferences, including without limitation, the type, name, number and size of any attachments (e.g., Excel files, Word files, audio files, MP3 files, JPEG files, PowerPoint files, PDF files, HTML files, and so on); additional tags, messages, banners or insertions, such as "spam" scores, discussed below; and other fields, such as the "CC" field or email group designations. New tags may also be created, such as a tag which summarizes the email, or a tag which compresses the email or its attachments (e.g., compresses a JPEG photograph to a thumbnail size), or tags which provide a summary or extraction of the most frequent or unique keywords in the email body. These extracted fields are then assembled by the protocol conversion system 100 into the second (SMS) message.

A particular advantage of the exemplary embodiments of the present invention is that a useful and meaningful subset of information is extracted and provided in a specialized message to the user, thereby providing enough information to effectively simulate a push operation of an entire email. In addition, such a simulated email push (1) is provided over a highly limited capacity channel (such as SMS) which is available in current mobile communications infrastructures; (2) uses a protocol and messaging type which is available to virtually all mobile units 160 such as legacy cellular telephones; and (3) in contrast to the prior art, does not require any specialized wireless infrastructures, use of higher capacity data channels, or use of specialized mobile devices, such as Blackberry devices.

Other advantages of the exemplary embodiments of the present invention include direct feedback from the mobile unit 160, which may also be utilized to modify or add to the various email notification rules, and may be updated and stored in the database 195. For example, the subscriber's mobile unit 160 may provide feedback concerning its remaining free memory capacity. When that capacity is reduced to a predetermined threshold, different types of email notifications and attachments may or may not be transmitted (e.g., transmitting email notifications without any attachments). Conversely, when additional capacity is restored, such as by deleting previous email notifications from memory, another update may be transmitted by the mobile unit 160 for updating and storing in the database 195, to resume transmission of email notifications (or larger emails) with attachments or other large files.

Which fields are selected, as indicated above, may be specified by the user through configuration of their account or may be selected automatically (as default fields, for example, when the user has not designated particular preferences). In addition to other processes discussed below, the first protocol to second protocol conversion system 100 performs one or more database 195 lookup operations, to obtain such configurations, and to determine the mobile directory number (mobile DN) of the user, for use in subsequent wireless transmission of the second (SMS) message to the corresponding mobile unit 160 of the user, illustrated as mobile unit 160A. This mobile DN is then utilized either to directly transmit the second (SMS) message to the mobile unit 160A, or as part of the header information in encapsulating the second (SMS) message into a third message (e.g., a third SMTP message), such as in header information ToMobileDN@WirelessCarrier.com.

The second (SMS) message formed in accordance with the invention, (which may be encapsulated in a third message and extracted by the first-to-second protocol gateway 140A (e.g., an SMTP-to-SMS gateway) or which may be transmitted directly to an MSC 150 or a base station 155), is then transmitted to the corresponding mobile unit 160 (illustrated for example as communication legs 225 in FIG. 2), via an MSC 150, base station 155, and any other intervening network devices utilized by the wireless communication service provider (such as a short message service center ("SMSC") 280, which may be stand-alone or which may be included within data message and data packet service center 145 (illustrated as communication leg 225A). Other routing and transmission choices are also available to service providers, are considered equivalent and also within the scope of the present invention (e.g., transmission through IP 180 or SN 175, for example). In exemplary embodiments, the second (SMS) message is typically transmitted when the mobile unit 160A is not engaged in another activity, such as to avoid an interruption during a voice communication session. When such other activity has ended or shortly thereafter, or when the mobile unit 160 is otherwise inactive, the second (SMS) message is generally transmitted by the base station 155. In addition, once a second (SMS) message has been transmitted to the mobile unit 160, additional content-based notifications may or may not be sent for a predetermined period of time, depending upon the selected embodiment, so that a user is not overwhelmed with such notifications, particularly while engaged in another activity.

The receipt of the second (SMS) message by the mobile unit 160 typically awakens or activates a background application or provides an interrupt to an interrupt driven application or task (or other application trigger) to the mobile unit 160A, launching an application to parse and display the second message on the screen or other user interface of the mobile unit 160, and to request a user response. (If a message is received by the mobile unit 160A which is not a second (SMS) message formed in accordance with the invention, the mobile unit 160A may display that message or resume a sleep mode, depending upon how the individual mobile unit 160A may be configured.)

For example, in exemplary embodiments, receipt of the second message by the mobile unit will launch a Java-enabled, Brew-enabled, or other type of program (such as the Eudora email program from Qualcomm or the Outlook email program from Microsoft), to provide the text and/or graphics display of the second message, and further display a link or button, for the user to select (or actuate) to receive the balance of the complete, original email message as a transparent pull operation. More specifically, from the point of view of the user/subscriber, the user has received an email push, and he/she may then determine whether to see any remaining balance of the email, in a pull operation which is transparent to the user. When the user does not request the complete email by selecting or actuating a displayed link or actuating a predetermined button on the mobile unit 160A, the application running on the mobile unit 160A will typically time out (after a predetermined period of time has elapsed) and resume a sleep mode, or continue with any other activity, such as continuing with a voice communication session.

When the user does request the complete email, a message is transmitted from the mobile unit 160A (via base station 155 and MSC 150) to the server 125C (referred to as a "fourth message", to distinguish the other message transmissions), requesting the transmission of the complete email to the mobile unit 160, illustrated as communication legs 230 (and 230A, 230B) in FIG. 2. Such a communication 230 may be provided between or among any of a plurality of paths and devices, such as through the gateway 140A (illustrated separately as communication leg 230A), through other gateways 140, through the data message and data packet service center 145 (illustrated separately as communication leg 230B), through SMSC 280 (illustrated separately as communication leg 230C), or otherwise directly through the Internet 115, with all such variations within the scope of the present invention. For example, the fourth message may be an Internet Message Access Protocol ("IMAP") message or a Post Office Protocol Version 3 ("POP3") message transmitted using a wireless data protocol (such as GPRS), may be an SMS message which is then converted within the network to an IMAP or POP3 message (such as in the data message and data packet service center 145, the first-to-second protocol gateway 140A, or in another intelligent network device), or may be another type of message.

With the IMAP or POP3 session opened to the server 125C, such as a MailSite® server, the requested email is matched with the original message stored at the server 125C. The requested email is then provided by server 125C, illustrated as communication 235 (also via various communication legs 235A or 235B, depending upon the selected embodiment), and may have any of various forms, also depending upon the selected embodiment and devices utilized, such as SMTP, HTTP, etc. The requested email may also be converted into different forms using any of a plurality of protocols, also depending upon the selected embodiment and devices utilized, such as whether the service provider will utilized a gateway 140, data message and data packet service center 145, etc. The requested email may then be converted and transmitted to the mobile unit 160A, typically utilizing a third or fourth protocol, such as a wireless data transmission protocol (e.g., GPRS), illustrated as communication 240. For example, the requested email may be transmitted using time and/or frequency division multiplexing, frequency division multiple access, or code division multiple access. In many applications operating on the user's mobile unit 160A, any HTML is stripped from the original email message, which is then provided as plain text to the application on the mobile unit, which is then displayed to the user incrementally, depending upon the amount of information the user's mobile unit 160A is capable of displaying. The user may also respond to the displayed email, such as with a reply, reply all, forward, or may cancel the viewing, with the original email retained on the server 125C. In addition, when the message has been transmitted using IMAP, the message is generally retained on the server 125C, and also may be downloaded on additional occasions.

As a consequence, to a user, the second message provides a content-based email notification, having significant and meaningful information for the user, and which appears as and simulates an email push operation from the service provider, but which is provided to a mobile unit 160 which does not have such message push capability, and is provided by an infrastructure which may or may not have such message push capability. In response, when the user requests what appears to be the balance of the email (which is provided as the complete email in communication legs 235), the user transparently performs a pull operation, generating an IMAP or other message to retrieve the complete email. This has also been accomplished without requiring the user to constantly or periodically poll or query an email server, thereby saving and conserving considerable network resources and available bandwidth, and saving and conserving power, battery life, and processor cycles.

Figure 3:
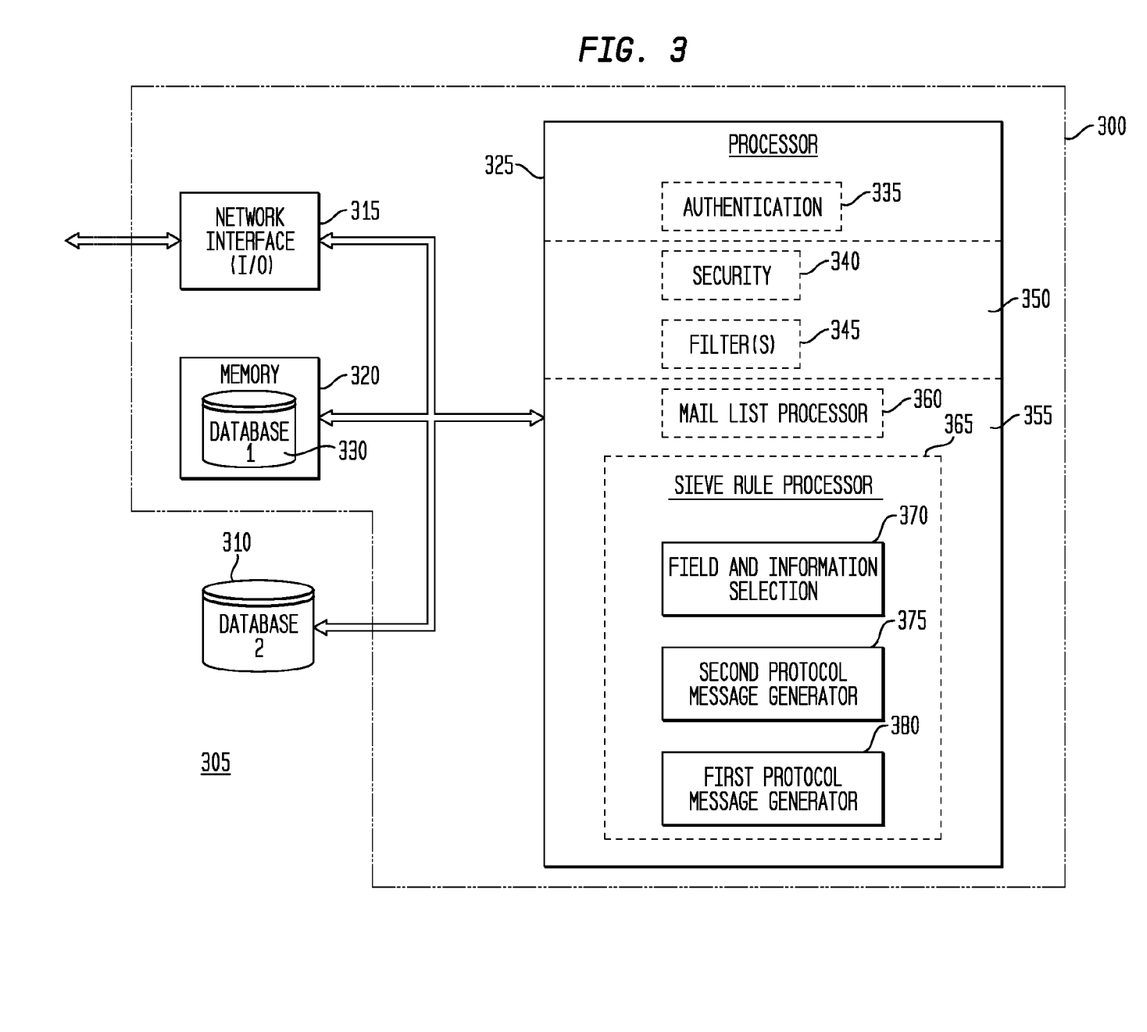
FIG. 3 is a block diagram illustrating an exemplary apparatus embodiment in accordance with the teachings of the present invention.

FIG. 3 is a block diagram illustrating an exemplary apparatus 300 embodiment and system 305 embodiment in accordance with the teachings of the present invention. As illustrated in FIG. 3, the apparatus 300 comprises a processor 325, a network interface 315, and a memory 320, with the system 305 further comprising the data repository 310. Such an apparatus 300, as discussed above, may be included within or comprise a first protocol to second protocol conversion system 100 and/or a server 125, such as server 125C, or included within or comprise the other network or communications equipment discussed above.

In the apparatus 300, the network interface 315 may be implemented as known or may become known in the art, to provide data communication and signaling between, first, the processor 325, memory 320 and/or data repository 310, and second, a communication channel, which may be wireless, optical or wireline, using any applicable standard or technology. For example, the network interface 315 may provide all signaling and physical interface functions, such as impedance matching, data input and data output between external communication lines or channels (e.g., Ethernet, T1 or ISDN lines) coupled to a network (such as Internet 115), and internal server or computer communication busses (e.g., one of the various PCI or USB busses), for example and without limitation. In addition, depending upon the selected embodiment, the network interface 315 (or the processor 325) may also be utilized to provide data link layer and media access control functionality.

The memory 320 (which may include a data repository (or database) 330), and the data repository (or database) 310, may be embodied in any number of forms, including within any computer or other machine-readable data storage medium, memory device or other storage or communication device for storage or communication of information such as computer-readable instructions, data structures, program modules or other data, currently known or which becomes available in the future, including, but not limited to, a magnetic hard drive, an optical drive, a magnetic disk or tape drive, a hard disk drive, other machine-readable storage or memory media such as a floppy disk, a CDROM, a CD-RW, digital versatile disk (DVD) or other optical memory, a memory integrated circuit ("IC"), or memory portion of an integrated circuit (such as the resident memory within a processor IC), whether volatile or non-volatile, whether removable or non-removable, including without limitation RAM, FLASH, DRAM, SDRAM, SRAM, MRAM, FeRAM, ROM, EPROM or $E^2$PROM, or any other type of memory, storage medium, or data storage apparatus or circuit, which is known or which becomes known, depending upon the selected embodiment. In addition, such computer readable media includes any form of communication media which embodies computer readable instructions, data structures, program modules or other data in a data signal or modulated signal, such as an electromagnetic or optical carrier wave or other transport mechanism, including any information delivery media, which may encode data or other information in a signal, wired or wirelessly, including electromagnetic, optical, acoustic, RF or infrared signals, and so on.

The apparatus 300 further includes one or more processors 325, adapted to perform the functionality discussed above and discussed in greater detail below. As the term processor is used herein, a processor 325 may include use of a single integrated circuit ("IC"), or may include use of a plurality of integrated circuits or other components connected, arranged or grouped together, such as microprocessors, digital signal processors ("DSPs"), parallel processors, multiple core processors, custom ICs, application specific integrated circuits ("ASICs"), field programmable gate arrays ("FPGAs"), adaptive computing ICs, associated memory (such as RAM, DRAM and ROM), and other ICs and components. As a consequence, as used herein, the term processor should be understood to equivalently mean and include a single IC, or arrangement of custom ICs, ASICs, processors, microprocessors, controllers, FPGAs, adaptive computing ICs, or some other grouping of integrated circuits which perform the functions discussed below, with associated memory, such as microprocessor memory or additional RAM, DRAM, SDRAM, SRAM, MRAM, ROM, EPROM or $E^2$PROM. A processor (such as processor 325), with its associated memory, may be adapted or configured (via programming, FPGA interconnection, or hard-wiring) to perform the methodology of the invention, as discussed above and as further discussed below. For example, the methodology may be programmed and stored, in a processor 325 with its associated memory (and/or memory 320) and other equivalent components, as a set of program instructions (or equivalent configuration or other program) for subsequent execution when the processor is operative (i.e., powered on and functioning). Equivalently, when the processor 325 may implemented in whole or part as FPGAs, custom ICs and/or ASICs, the FPGAs, custom ICs or ASICs also may be designed, configured and/or hard-wired to implement the methodology of the invention. For example, the processor 325 may implemented as an arrangement of microprocessors, DSPs and/or ASICs, collectively referred to as a "processor", which are respectively programmed, designed, adapted or configured to implement the methodology of the invention, in conjunction with one or more databases (310, 330) or memory 320.

As indicated above, the processor 325 is programmed, using software and data structures of the invention, for example, to perform the methodology of the present invention. As a consequence, the system and method of the present invention may be embodied as software which provides such programming, such as a set of instructions and/or metadata embodied within a computer (or other machine) readable medium, discussed above. In addition, metadata may also be utilized to define the various data structures of database 195, such as to store user preferences and configurations.

More generally, the system, methods, apparatus and programs of the present invention may be embodied in any number of forms, such as within any type of server 125, within a processor 325, within a machine-readable media, within a computer network, within an adaptive computing device, or within any other form of computing or other system used to create or contain source code, including the various processors and computer or other machine-readable media mentioned above. Such source code further may be compiled into some form of instructions or object code (including assembly language instructions or configuration information). The software, source code or metadata of the present invention may be embodied as any type of source code, such as C, C++, Java, Brew, SQL and its variations (e.g., SQL 99 or proprietary versions of SQL), DB2, XML, Oracle, or any other type of programming language which performs the functionality discussed herein, including various hardware definition languages (e.g., Verilog, HDL), when embodied as an ASIC. As a consequence, a "construct", "program construct", "software construct" or "software", as used herein, means and refers to any programming language, of any kind, with any syntax or signatures, which provides or can be interpreted to provide the associated functionality or methodology specified (when instantiated or loaded into a processor or computer and executed, including the server 125 or processor 325, for example).

The software, metadata, or other source code of the present invention and any resulting bit file (object code or configuration bit sequence) may be embodied within any tangible storage medium, such as any of the computer or other machine-readable data storage media, as computer-readable instructions, data structures, program modules or other data, such as discussed above with respect to the memory 320, e.g., a floppy disk, a CDROM, a CD-RW, a magnetic hard drive, an optical drive, or any other type of data storage apparatus or medium, as mentioned above.

The processor 325, typically included within a server 125 embodiment (such as server 125C), implements functionality which may be loosely divided into three groups: (1) user and account authentication, as a "front end" agent (335); (2) security (340) and filtering (345), as a "relay" agent 350; and (3) as a "delivery" agent (355), a mail list processor or engine (360) and a sieve rule processor or engine 365 (implementing field and information selection (370), second protocol message generation (375), and first (or third) protocol message generation (380)). Again, as mentioned above, the inclusion (or exclusion) and execution of these various functions may be determined through user configuration and preference selection, by default when no preferences have been indicated, or through updating and rule modification, such as through feedback from a mobile unit 160. In addition, in the exemplary embodiments, this functionality is provided as modular units, allowing the inclusion or exclusion of a particular function, and allowing the incorporation of new functionality, without affecting other functions. Similarly, various functions are also implemented utilizing database lookups, allowing functional revisions without changes in architecture or system programming or other coding. For example, new virus definitions may be added into databases 310, 330 or memory 320, without reprogramming. Similarly, user defined and updated rules may be added and changed in the databases 310, 330 or memory 320, also without reprogramming.

When a first email message has arrived at the apparatus 300, such as a server 125C, either as direct or forwarded email, the processor 325 will perform front end operations, such as account verification or other authentication, to determine that the addressed email is for a user or subscriber in good standing, typically through various database (310, 330) look up operations. When such email has been verified or authenticated, the email is passed to the relay agent 350, as the first of two "back end" processes; otherwise, the email simply may be discarded.

The processing steps performed by the relay agent 350 of the processor 325 are security (340) and filtering (345), both of which may also require various database (310, 330) look up operations, and which may be selectively included and performed in any of various orders, statically or dynamically. Depending upon the user or default preferences, the outcomes from these processes may be modification, editing, redirecting, annotating, quarantining, delivering, or deletion (rejection) of the first (SMTP) email message. The various security 340 processing layers may be implemented as known or becomes known in the art and may include or comprise, without limitation, Directory Harvest Attack Protection (DHAP); Secure Sockets Layer (SSL v.3); Transport Layer Security (TLS and TLS v.1); white listing (allowing messages from selected sources); black listing (deleting messages from selected sources); Real-time Blacklist Lookup; a firewall; and any user-defined security processes (e.g., reverse DNS (domain name server or service), limiting SMTP to local IP addresses, blocking specific hosts or IP addresses, blocking specific FROM addresses, validation of source domains, etc.). For example, an encrypted message may be decrypted, for subsequent field selection to formulate the second (SMS) message. Those email messages which have passed any applicable security checks or which have been modified by the security layers are then passed to the filtering 345 functionality.

One or more filters 345 are implemented in processor 325, which may modify, edit, delete (reject), add, redirect, archive, log or quarantine the email. In exemplary embodiments, the various filters 345 may also be implemented with sieve rule functionality, to provide both a determination of an occurrence of an event, such as determining that a given email is spam (an unwanted email from an unsolicited source or from a source having no pre-existing relationship with the user/subscriber), followed by performance of an activity or action in response to that determination, such as deleting or rejecting the email. Various exemplary filters 345 which may be selectively included and performed in any of various orders, statically or dynamically, may include, as examples and without limitation, (1) an anti-spam filter; (2) sieve rules; (3) anti-virus filters; and (4) banner or tag insertion. The various tags or scores which may be inserted in the message during processing may be utilized for analysis or actions by another process (such as a sieve rule) or may be included within the second (SMS) message for transmission to the mobile unit 160 of the particular user.

For example, in an exemplary embodiment, the anti-spam filter processes the email message envelope, header and/or text in the message body, plus any attachments, and then generates a spam score and adds the spam score as a tag to the first (SMTP) message during processing. This spam score tag may then may be utilized by a subsequent sieve rule to delete the message or, if not deleted, transmitted to the mobile unit, or may be utilized by the user to determine whether to download the complete message. In exemplary embodiments, anti-spam filtering may include heuristics, profiles, keywords, white lists, and black lists, for example, with a spam score calculated based on pattern matching, spam definitions, and heuristic analysis. The ability of the filters and sieve rules to create new tags allows other sieve rules to look for and make decisions on these tags, such as file sizes, attachment (or extension) types, amount of free memory on the mobile unit 160, in addition to such spam scores.

Various sieve rules are also implemented in exemplary embodiments, and may be embodied using sieve scripts, such as those proposed as a standard in Internet Engineering Task Force (IETF) RFC 3028. Utilizing various matching rules (filters) applied to one or more of the message envelope, header, body, and message tags (created by previous filters and processes of the invention), the various sieve scripts can discard (reject), redirect, modify, edit, file, quarantine, archive, log, annotate or add to the email. For example, various emails meeting predetermined criteria may be archived or logged to provide an additional record of received email messages, such as for reporting, privacy and compliance requirements, e.g., various statutes (and accompanying regulations) such as the Sarbanes-Oxley Act of 2002, the Health Insurance Portability and Accountability Act (HIPAA) (privacy of health records), the Gramm-Leach-Bliley Act (GLBA) (privacy of nonpublic personal and financial records). Following application of such sieve rules, the message is processed using anti-virus filters, to check for viruses, worms or other destructive programs or agents in the email or any attachments.

Another filter utilized in the exemplary embodiments is an editing or "banner" filter, which may be utilized to insert or delete any selected text or graphics into the email message. For example, an advertisement or a service provider or vendor signature may be inserted into the email. Such an editing filter may also delete various banners, other advertisements, or other information, such as based upon user preferences and configurations. In addition, the editing filter may perform combinations of such activities, such as deleting certain information and inserting new information. User-defined filters may also be implemented. Following filtering, the partially processed first email message is transferred to the delivery agent 355 for additional processing, or to a buffer (or spooler), such as a buffer in memory 320 or in processor 325, when the delivery agent 355 is unavailable.

Processing of the email message by the delivery agent 355 includes several functions in the exemplary embodiments, which may be selectively implemented, embodied in a plurality of ways, and performed in a wide variety of orders, dynamically and statically, with all such variations considered equivalent and within the scope of the present invention. Again, as mentioned above, performance of these various processes may also include various memory 320 and database 310, 330 accesses and lookups for information retrieval, such as user preferences and defined rules. Following the processes of the relay agent 350, a mail list processor 360 is utilized to expand or contract the mailing list of the particular email, such as adding or deleting recipients. The partially processed email message is then transferred to the sieve rule processor 365, which implements specialized or predetermined rules, in accordance with the present invention, to create and encapsulate the second (SMS) message, for subsequent transmission to the mobile unit 160. These various rules may be stored in memory 320 and/or database 310, 330, accessed accordingly, and utilized to select and operate upon the various fields of the first email message (as partially processed). This use of sieve rules provides tremendous flexibility in processing the first message and creating the second message, including enabling rather complicated decision processes. In addition, this use of sieve rule functionality to create an SMS or other second message is, in itself, a novel combination. While implemented as a sieve rule processor 365 in the exemplary embodiments, those of skill in the art will recognize that myriad other processing embodiments are available to extract, query, and generate a second (SMS) message, and all are within the scope of the present invention.

In order to construct the second (SMS) message, the sieve rule processor 365 selects the "TO" field of the message and performs a memory 320 and/or database 310, 330 query or lookup, to obtain the user's SMS address, such as the mobile directory number (mobile DN) and wireless carrier (or service provider) for the user's mobile unit 160, such as an SMS address of ToMobileDN@WirelessCarrier.com. Those of skill in the art will recognize that any of a plurality of fields of the first email message may be utilized for database 310, 330 queries to obtain or download one or more customized or specialized rule(s) for the selected email to be processed. The sieve rule processor 365 will then utilize the corresponding rule(s) to further process the first (partially processed) email message, using any of a plurality of transformations, to form the second (SMS) message. Using corresponding sieve rules, which may be user-defined, configured, updated, adapted or default rules, the sieve rule processor 365 extracts a meaningful subset of information from the original or first (partially processed) email message and transforms the information into a second message having a second, different protocol, such as transforming the SMTP message into a SMS message. As indicated above, the sieve rule processor 365 will apply selected sieve rules of a plurality of sieve rules, extracting information (field and information selection process 370) from various fields of the original or forwarded (and partially processed) email, such as the information in the "FROM" field; the "TO" field; the "DATE" field; the "SIZE" field; the "SUBJECT" field; any and all bytes or characters from the "BODY" field up to the remaining capacity of the second SMS message; the type, name, number and size of any attachments; additional tags, messages, banners or insertions, such as "spam" scores; and other fields, such as the "CC" field or email group designations. In addition, other types of rules or preferences discussed above, such as selective forwarding rules based on sender, day of the week, time of day, and so on, may also be implemented using the sieve rule processor 365.

In accordance with the present invention, the various extracted fields and other information will be assembled, by the second protocol message generator 375 of the sieve rule processor 365, to form the second (SMS) message, with such assembly varying based upon a wide variety of factors, including how the first message was transmitted to the server 125C. For example, in a forwarded email message, both the FROM field and the TO fields will designate the user/subscriber; accordingly, various rules or processes may be implemented to extract the sender information from the original FROM field of the original email. Conversely, in an email message transmitted directly to the server 125C, such as to user@mailsite.com, the FROM field (if not spam) will properly designate the sender of the email. As a consequence, the sieve rule processor 365 implements a plurality of corresponding rules or processes, extracting or copying selected and predetermined information from the original or forwarded (and partially processed) email, followed by placing or writing that extracted information into a predetermined field of the second (SMS) message. As indicated above, those predetermined fields may be user-determined or provided by default, and may be updated, self-changing and adapted over time. In addition, the sieve rule processor 365 may also add or insert the various tags, banners and scores mentioned above, and add other information, such as email priority, status (e.g., confidential), and so on. For example, various service providers and gateways (e.g., a gateway 140A) may need certain information which may be included as tags, for authorization of the second message and for billing purposes.

As a result, a second (SMS) message has been created by the sieve rule processor 365, which has a much smaller size (or lower capacity) than the original email message, and which may be transmitted to the user's mobile unit 160A. The second (SMS) message may be provided as a content-based notification, a simulated push, of the larger, original email, without any user action, polling or querying from the user's mobile unit 160A. In addition, because significant and meaningful information was differentially selected for inclusion in or to comprise the second (SMS) message, in many instances, the second (SMS) message may itself be sufficient, with no user-determined pull operation needed for the complete, original email.

As indicated above, depending upon the location of the server 125C, the second (SMS) message may be transferred directly to a base station 155 and transmitted to the user's mobile unit 160A. Those of skill in the art will recognize that a wide variety of mechanisms are available to transmit the second (SMS) message to a remotely located base station 155. Under other circumstances, such as when the server 125C is located remotely from the serving MSC 150 or base station 155, which may occur when the server 125C is provided by a vendor other than the wireless carrier, or when the user's mobile unit 160A has roamed into a visiting area, the second (SMS) message will need to be transmitted to the base station 155 through a network, either a packet-based network such as internet 115 or a circuit-switched (PSTN) network 190. In exemplary embodiments, the second message is encapsulated by the processor 325 (sieve rule processor 365) as a payload in third message, using another (third) protocol (such as SMTP, HTTP, XML, SIMPLE, IRC, XMPP or IM, etc.) and transmitted over the internet 115 to the wireless carrier, using the user's mobile directory number and wireless carrier information. More specifically, when the first protocol is also to be utilized for the third message, the first protocol message generator 380 encapsulates the second (SMS) message in a third, SMTP message, addressed to User'sMobileDN@WirelessCarrier.com, which is then transferred to the network interface 315 for transmission over a data packet channel (internet 115). In the event other, third protocols are to be utilized, the message generator 380 will be configured accordingly, to encapsulate the second message in a third message having the selected, third protocol, such as the various protocols mentioned above.

In an exemplary embodiment, the third (SMTP) message, encapsulating the second (SMS) message, is then transmitted to the base station 155 via the first-to-second protocol (SMTP-to-SMS) gateway 140A. Correspondingly, the first-to-second protocol (SMTP-to-SMS) gateway 140A has been configured or adapted to recognize that this type of email message contains an SMS payload to be transmitted to a user/subscriber. Such a gateway 140A typically has a predefined interface or configuration, to recognize such a specially formatted third message and extract proper fields containing the encapsulated second message. In turn, gateway 140A extracts the second (SMS) message from the body of the third (SMTP) message and transfers it to the base station 155 (via transmission over intervening network devices, such as an MSC 150 and other switching or data transfer centers). Other types of gateways 140 (switching centers), data message and data packet service center 145 or other network devices discussed above may also be utilized, depending upon the protocol selection for the third message, and all are considered equivalent and are within the scope of the present invention. The base station 155, in turn, transmits the second (SMS) message to the user's mobile unit 160A, communication 225, as discussed above.

Those of skill in the art will recognize that the principles of the present invention may be extended to other communication systems, such as voice communications. For example, rather than merely notifying a user of the existence of a voice mail, a content-based notification may be utilized which includes important information, such as caller name and caller directory number (Caller I.D.) fields, providing a simulated voice mail push operation. In addition, the principles of the present invention also may be extended to other, bandwidth limited communication systems, such as dial-up (analog modem) connections. For example, when a user is traveling in a remote or rural area, high-speed or high bandwidth data services may not be available; use of the present invention would enable such a user to receive important, significant information, in a much more compact and efficient form, bypassing the inherent delays and limitations of such systems.

Figure 4:
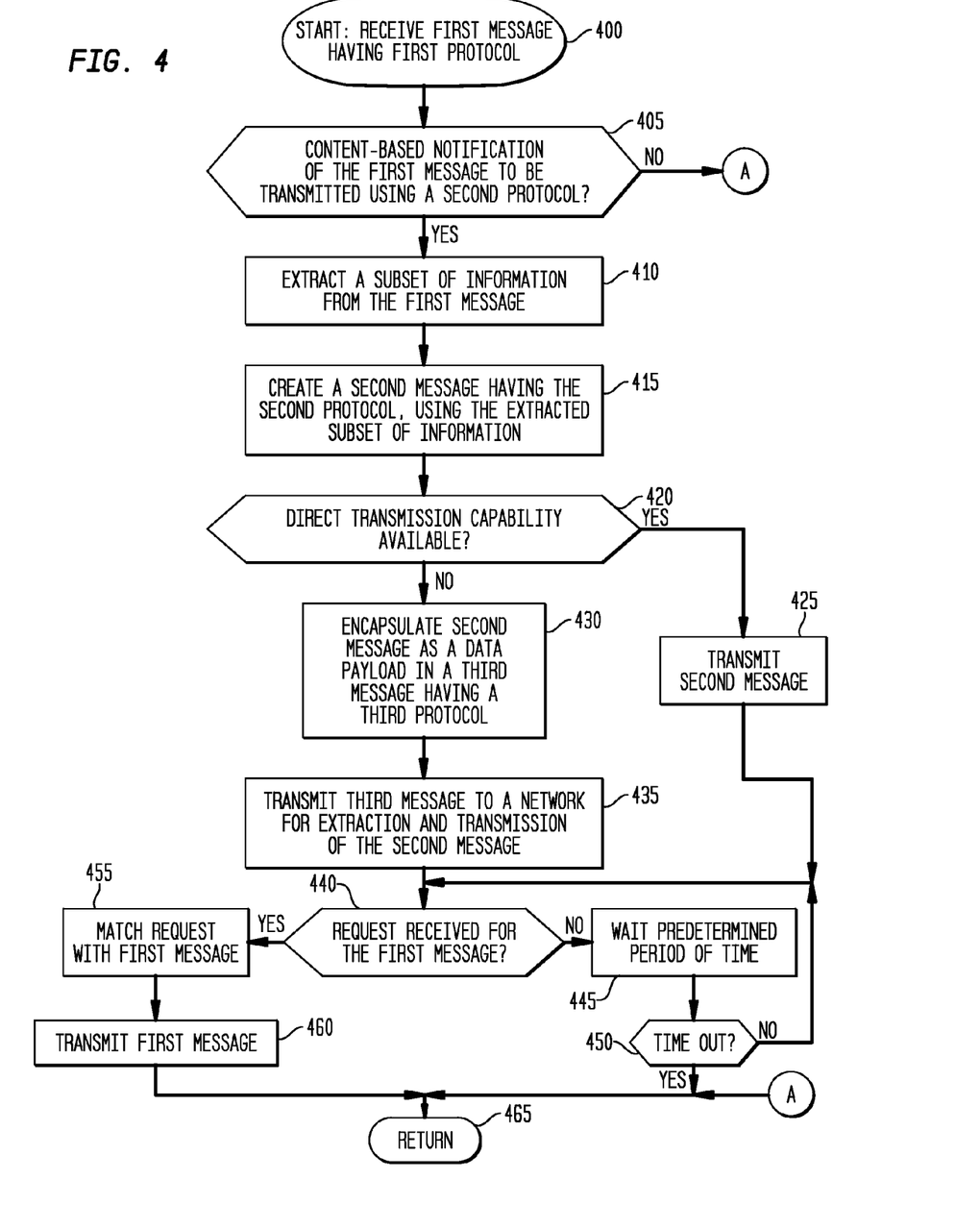
FIG. 4 is a flow diagram illustrating a first exemplary method embodiment in accordance with the teachings of the present invention.

FIG. 4 is a flow diagram illustrating a first exemplary method embodiment in accordance with the teachings of the present invention, and provides a useful summary of the processing provided by the server 125C (with protocol conversion system 100), the apparatus 300 and/or system 305. The method begins, start step 400, with reception of a first message having a first protocol, such as a first email message having the SMTP protocol. As known in the art, such a first message is typically received through a TCP connection at port 25 of the server 125C, or at other designated ports when a plurality of servers 125 (e.g., a server farm) are utilized. The method then determines whether a content-based notification of the first message is to be transmitted to the user's mobile unit 160A, step 405, utilizing a second protocol having an information transmission capacity which is less than the information transmission capacity of the first protocol. As discussed above, such a determination is typically made by the relay agent 350, and may also include the front end authentication process. For example, applying the various security and filtering processes, the method may determine whether the email includes a virus, is spam, is from an unwanted sender, etc. When the first message is not to be transmitted in step 405, the method may end, return step 465.

When the first message is to be transmitted in step 405, the method proceeds to step 410, to extract a subset of information from the first message. The method then creates a second message having a second protocol, with the second message containing or comprising the extracted or selected subset of information, step 415.

In a selected embodiment, the method then determines whether wireless transmission capability is available for the selected mobile unit 160, step 420, and when so available, the method transmits the second message, step 425, and the method may proceed to step 440. For example, steps 420 and 425 are typically utilized when the server 125C is co-located with a base station 155 or MSC 150 and the selected mobile unit 160 is within its assigned home region. In other embodiments, such as when a server 125C is located remotely from a base station 155 or MSC 150 or the selected mobile unit 160 is out of its assigned home region (i.e., is roaming), such that wireless transmission capability is not available for the selected mobile unit 160 in step 420, the method proceeds to step 430. It should also be noted that the determination step 420 may also be omitted in various embodiments, where the location of the server 125C is known to be remote from such wireless transmission equipment, such as when provided by a third party vendor and not by the wireless service provider. In addition, more than one encapsulation protocol may be utilized, depending upon network (115, 190) loads and availability. For example, load balancing may be utilized to select a protocol which, when transmitted over the selected network, would result in either the fastest or least expensive means of transmission to the mobile unit 160. Similarly, another protocol may be selected which would result in increased reliability of transmission to the mobile unit 160.

In step 430, the method encapsulates or tunnels the second message into or as the data payload of a third message having a third protocol, and provides the third message with corresponding routing or user identification information. In many instances, the third protocol may be the same as the first protocol, e.g., SMTP; in other instances, a different protocol may be utilized, such as HTTP, XML, SIMPLE, IRC, XMPP or IM. When SMTP is utilized in step 430, the second message is encapsulated as the message body, and the third (SMTP) message is provided with routing or addressing to the selected user, such as addressed to User'sMobileDN@WirelessCarrier.com. The third message is then transmitted (via network interface 315) over a channel, such as the internet 115, step 435, to a wireless network for extraction of the second message from the third message and transmission of the second message to the mobile device.

The method then determines whether a request has been received for the first message, such as through an IMAP or POP3 request generated by the selected mobile unit 160, step 440. When no such request has been received, the method waits a first predetermined period of time (steps 445 and 450), and returns to step 440, unless a second predetermined period of time has elapsed (a timeout in step 450), in which case the method may end, return step 465. When a request has been received for the first message in step 440, the method proceeds to step 455, and matches the request with the first message. The method then transmits the first message, step 460, typically as part of the IMAP or POP3 session established in step 440. Following steps 405, 450 or 460, the method may end, return step 465.

Figure 5:
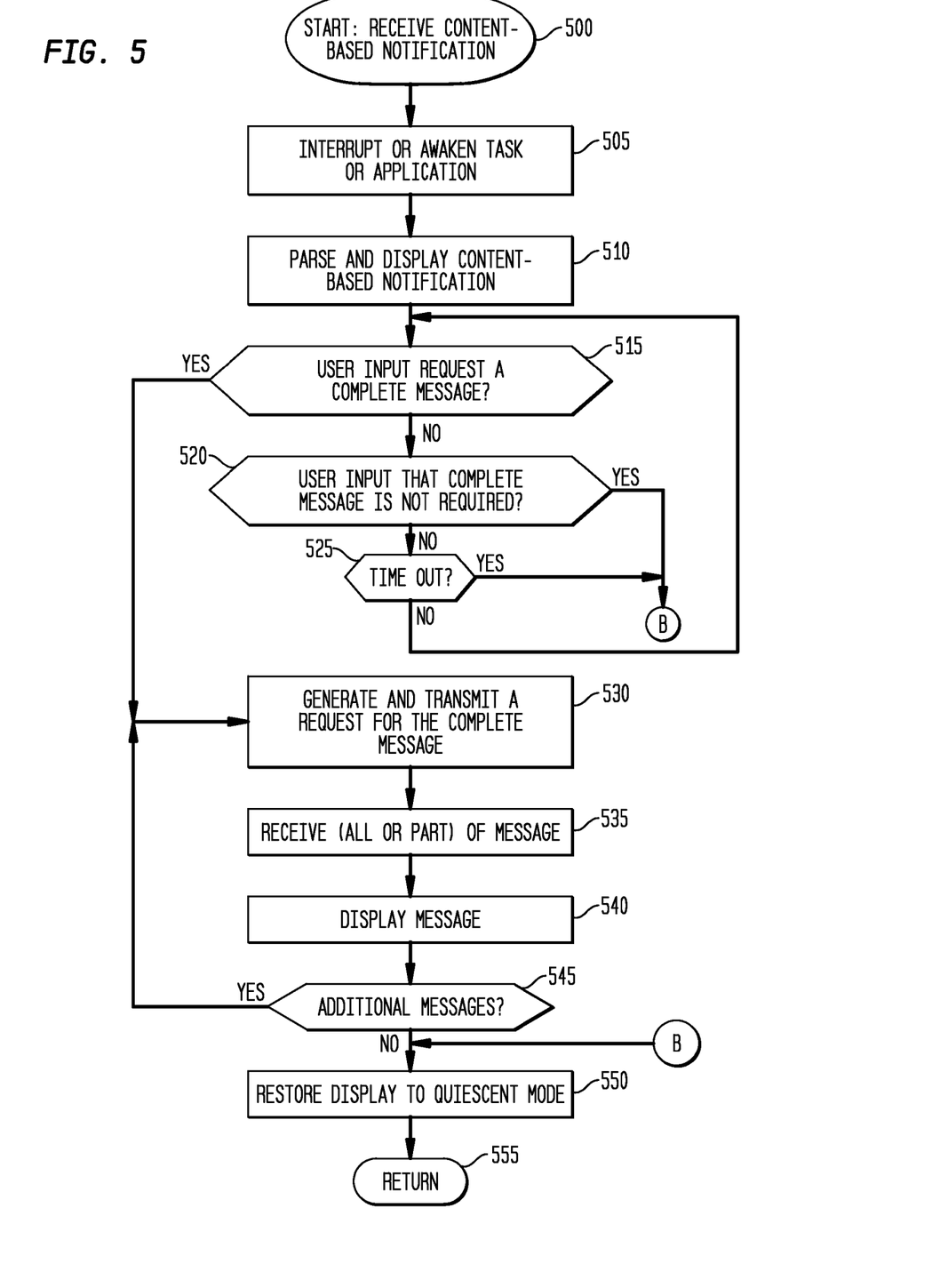
FIG. 5 is a flow diagram illustrating a second exemplary method embodiment in accordance with the teachings of the present invention.

FIG. 5 is a flow diagram illustrating a second exemplary method embodiment in accordance with the teachings of the present invention, which typically occurs at a selected mobile unit 160, such as a cellular telephone, as part of the methodology of the present invention. The method begins, start step 500, with receipt of a message, such as a second message or an SMS message, as a content-based notification. The receipt of the message typically generates an interrupt or awakens a task or application, step 505. The application then parses and displays the (second) message, and requests user input, step 510, such as by displaying a link or button. When user input requests a complete message in step 515, i.e., the balance of the email which may not have been incorporated into the email notification, the method proceeds to step 530. When the user does not request the complete message in step 515, or the user has indicated that the complete message is not required in step 520 (e.g., by affirmatively providing a "no" in response to the link or button), or when a predetermined period of time has elapsed (step 525, timeout), the method proceeds to step 550.

When the user has requested a complete message in step 515, the method generates and transmits a request, such as an IMAP or POP3 request, step 530. The complete message is then received, step 535, typically using a different and higher capacity protocol than the (second) message of step 500. The complete message may or may not be the entire email, depending upon the data capacity of the protocol utilized to transmit the message (for example, it may be limited to a predetermined number of bytes). The message is then displayed, step 540. When there are additional messages, step 545, the method returns to step 530. When there are no more messages in step 545, or following step 525, the method restores the display to its quiescent (e.g., sleep or power saving) mode, step 550, and the method may end, return step 555.

Numerous advantages of the present invention are readily apparent. The exemplary embodiments create a content-based notification of an email which is transmitted to a mobile device, such as a cellular telephone or PDA, thereby providing a simulated push operation of email to these devices which are capable of only pull operations, and using a wireless transmission infrastructure which does not have such separate push capability or is otherwise limited by bandwidth or service capacity. The exemplary embodiments utilize available protocols having limited capacity channels to provide a notification of an email to the mobile device, with the notification having sufficient and meaningful information to enable a user to reasonably determine whether to view a corresponding complete email using a transparent pull operation. The exemplary embodiments also provide for user customization, such that a user is notified of only those emails which the user has determined would be significant in a given period of time.

It is to be understood that this application discloses a system, apparatus, software and method for creating a content-based notification of an email as a simulated push operation. While the invention is particularly illustrated and described with reference to exemplary embodiments, it will be understood by those skilled in the art that numerous variations and modifications in form, details, and applications may be made therein without departing from the spirit and scope of the novel concept of the invention. Some of these various alternative implementations are noted in the text. Other changes include, but are not limited to protocols used for communication between servers and devices and the specific arrangement of devices. It is to be understood that no limitation with respect to the specific methods and apparatus illustrated herein is intended or should be inferred. It is, of course, intended to cover by the appended claims all such modifications as fall within the scope of the claims.

It is claimed:

1. A method of creating a notification for a mobile device, the notification having information content, the method comprising:
    receiving a first message of a plurality of messages, the plurality of messages transmitted using a Simple Mail Transport Protocol (SMTP) or an extension of SMTP, each message of the plurality of messages having a plurality of fields;
    selecting one or more fields of the plurality of fields from the first message to extract a subset of information, the one or more selected fields having been predetermined, the one or more selected fields comprising at least one field selected from the group consisting of: a "FROM" field; a "TO" field; a "DATE" field; a "SIZE" field; a "SUBJECT" field; a "CC" field; a "BODY" field; an attachment type; an attachment name; a number of attachments; an attachment size; an inserted tag; an inserted message; an inserted banner; an inserted spam score; an email group designation; a user-defined field; and combinations thereof;
    using the extracted subset of information, creating a second message comprising data to be used for the information content of the notification of the first message, the information content for subsequent transmission to the mobile device using a communication protocol selected from the group consisting of: an Extensible Messaging and Presence Protocol (XMPP), an extension of XMPP, a Short Message Service (SMS) protocol, an extension of SMS, a Hypertext Transfer Protocol (HTTP), an Internet Protocol (IP), and combinations thereof;
    encapsulating the second message as a data payload in a third message having at least one protocol selected from the group consisting of: a Simple Mail Transport Protocol (SMTP), an extension of Simple Mail Transport Protocol, a Hypertext Transfer Protocol (HTTP), an Internet Protocol (IP), SIP (Session Initiation Protocol) for Instant Messaging and Presence Leverage Extensions (SIMPLE), Internet Relay Chat (IRC), Extensible Messaging and Presence Protocol (XMPP) or an extension of XMPP, Instant Messaging (IM), and combinations thereof;
    providing an address header for the third message for the mobile device; and
    transmitting the third message to a server for the extraction of the data payload and the subsequent transmission of the information content over a wireless network to the mobile device.

2. The method of claim 1, wherein the second message is formatted as a single message having the information content for subsequent transmission using SMS or XMPP.

3. The method of claim 1, wherein the second message is formatted as a single script object having the information content for subsequent transmission using SMS or XMPP.

4. The method of claim 3, wherein the script object is a javascript object.

5. The method of claim 1, wherein the one or more selected fields are predetermined by one or more user settings of the mobile device.

6. The method of claim 1, wherein the one or more selected fields are predetermined by an email service provider.

7. The method of claim 1, further comprising:
    determining whether the notification having information content for the first message should be provided.

8. The method of claim 7, wherein the step of determining whether the notification having information content should be provided further comprises configuring one or more user settings of the mobile device for selective display of the notification having information content.

9. The method of claim 7, wherein the step of determining whether the notification having information content for the first message should be provided further comprises at least one process selected from the group consisting of: modifying the first message, rejecting the first message, deleting the first message, redirecting the first message, archiving the first message, logging the first message, quarantining the first message, and combinations thereof.

10. The method of claim 7, wherein the step of determining whether the notification having information content for the first message should be provided further comprises:
    filtering the first message using at least one filter of a plurality of filters, the at least filter selected from the group consisting of: a spam filter; a blacklist; an allowable message list; a prohibited message list; a user-defined security processes; and combinations thereof.

11. The method of claim 7, wherein the step of determining whether the notification having information content for the first message should be provided further comprises determining whether the first message is suspected to be a spam email message.

12. The method of claim 1, wherein the steps of receiving the first message, selecting one or more fields of the plurality of fields, creating the second message, encapsulating the second message as a data payload in the third message, providing the address header for the third message for the mobile device, and transmitting the third message are performed by an email application server.

13. The method of claim 1, wherein the information content of the notification further comprises a user response indication or link.

14. The method of claim 1, further comprising:
    in response to a user request, transferring the first message for transmission of all or part of the first message to the mobile device.

15. A system for creating a notification for a mobile device, the notification having information content, the system comprising:
    a database storing user information; and
    one or more servers coupled to the database, the one or more servers to receive a first message of a plurality of messages, the plurality of messages transmitted using a Simple Mail Transport Protocol (SMTP) or an extension of SMTP, each message of the plurality of messages having a plurality of fields; to select one or more fields of the plurality of fields from the first message to extract a subset of information, the one or more selected fields having been predetermined, the one or more selected fields comprising at least one field selected from the group consisting of: a "FROM" field; a "TO" field; a "DATE" field; a "SIZE" field; a "SUBJECT" field; a "CC" field; a "BODY" field; an attachment type; an attachment name; a number of attachments; an attachment size; an inserted tag; an inserted message; an inserted banner; an inserted spam score; an email group designation; a user-defined field; and combinations thereof; using the extracted subset of information, to creating a second message comprising data to be used for the information content of the notification of the first message, the information content for subsequent transmission to the mobile device using a communication protocol selected from the group consisting of: an Extensible Messaging and Presence Protocol (XMPP), an extension of XMPP, a Short Message Service (SMS) protocol, an extension of SMS, a Hypertext Transfer Protocol (HTTP), an Internet Protocol (IP), and combinations thereof; to encapsulate the second message as a data payload in a third message having at least one protocol selected from the group consisting of: a Simple Mail Transport Protocol (SMTP), an extension of Simple Mail Transport Protocol, a Hypertext Transfer Protocol (HTTP), an Internet Protocol (IP), a SIP (Session Initiation Protocol) for Instant Messaging and Presence Leverage Extensions (SIMPLE), Internet Relay Chat (IRC), an Extensible Messaging and Presence Protocol (XMPP) or an extension of XMPP, Instant Messaging (IM), and combinations thereof; wherein the data payload is extractable from the third message to form the information content of the first message for the subsequent transmission to the mobile device to provide the notification; to provide an address header for the third message for the mobile device; and to transmit the third message to a push server of the one or more servers for subsequent transmission of the information content over a wireless network to the mobile device.

16. The system of claim 15, wherein the second message is formatted as a single message having the information content for subsequent transmission using SMS or XMPP.

17. The system of claim 15, wherein the second message is formatted as a single script object having the information content for subsequent transmission using SMS or XMPP.

18. The system of claim 17, wherein the script object is a javascript object.

19. The system of claim 15, wherein the one or more selected fields are predetermined by one or more user settings of the mobile device.

20. The system of claim 15, wherein the one or more selected fields are predetermined by an email service provider.

21. The system of claim 15, wherein the one or more servers further are to determine whether the notification having information content for the first message should be provided.

22. The system of claim 21, wherein the determination of whether the notification having information content should be provided further comprises determining a user account configuration or preference.

23. The system of claim 21, wherein the determination of whether the notification having information content should be provided further comprises determining whether the first message is suspected to be a spam email message.

24. The system of claim 15, wherein the one or more servers further are one or more an email application servers or one or more push servers.

25. The system of claim 15, wherein the information content of the notification further comprises a user response indication or link.

26. The system of claim 15, wherein the one or more servers, in response to a user request, further are to transfer the first message for transmission of all or part of the first message to the mobile device.

* * * * *